US009008227B2

(12) United States Patent
Smith et al.

(10) Patent No.: US 9,008,227 B2
(45) Date of Patent: Apr. 14, 2015

(54) RADIO FREQUENCY COMMUNICATION

(75) Inventors: Andrew James Smith, Colchester (GB); Mark Trevor Newman, Heybridge (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 14/235,739

(22) PCT Filed: Jul. 26, 2012

(86) PCT No.: PCT/GB2012/051794
§ 371 (c)(1),
(2), (4) Date: Jan. 28, 2014

(87) PCT Pub. No.: WO2013/017845
PCT Pub. Date: Feb. 7, 2013

(65) Prior Publication Data
US 2014/0177691 A1    Jun. 26, 2014

(30) Foreign Application Priority Data
Jul. 29, 2011  (GB) .................................. 1113130.7

(51) Int. Cl.
*H04L 27/38* (2006.01)
*H04L 25/02* (2006.01)
*H04B 1/26* (2006.01)

(52) U.S. Cl.
CPC .............. *H04L 25/0292* (2013.01); *H04B 1/26* (2013.01)

(58) Field of Classification Search
CPC ........... H04D 7/16; H04D 7/161; H04L 27/38
USPC ................................. 375/316; 455/84, 85, 86
See application file for complete search history.

(56) References Cited

U.S. PATENT DOCUMENTS

| 5,894,496 A * | 4/1999 | Jones ............................ 455/126 |
| 6,181,365 B1 * | 1/2001 | Nakagawara ................. 725/124 |
| 2001/0001616 A1 | 5/2001 | Rakib et al. |
| 2005/0164662 A1 * | 7/2005 | Tseng et al. .................. 455/131 |

(Continued)

FOREIGN PATENT DOCUMENTS

| JP | 8-274590 A | 10/1996 |
| WO | WO 96/24989 A2 | 8/1996 |

OTHER PUBLICATIONS

International Search Report (PCT/ISA/210) mailed on Nov. 7, 2012, by the European Patent Office as the International Searching Authority for International Application No. PCT/GB2012/051794.
Written Opinion (PCT/ISA/237) mailed on Nov. 7, 2012, by the European Patent Office as the International Searching Authority for International Application No. PCT/GB2012/051794.
Untied Kindgom Search Report for GB 1113130.7 dated Nov. 11, 2011.

(Continued)

*Primary Examiner* — Kevin Kim
(74) *Attorney, Agent, or Firm* — Maine Cernota & Rardin

(57) ABSTRACT

An analog modem circuit and carrier recovery method are disclosed for use between an RF receiver and a digital modem circuit configured for receiving a baseband RF input signal, and including an up-converter with frequency supplied by an up-converter voltage controlled oscillator, VCO; a down-converter with frequency supplied by a down-converter VCO; a Costas loop sub-module; and baseband outputs from the down-converter to a digital modem circuit. The up-converter feeds the down-converter, and the Costas loop module performs Costas loop functionality on the output of the down-converter to control the up-converter VCO frequency output to thereby control modification of rotation of symbols of the baseband signal.

13 Claims, 11 Drawing Sheets

(56) References Cited

U.S. PATENT DOCUMENTS

2007/0160168 A1 7/2007 Beukema et al.
2011/0122932 A1 5/2011 Lovberg et al.
2011/0211649 A1* 9/2011 Hahn et al. .................... 375/285
2011/0248753 A1 10/2011 Leistner

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA/237) dated Feb. 13, 2014, issued in corresponding International Application No. PCT/GB2012/051794. (9 pgs.).

* cited by examiner

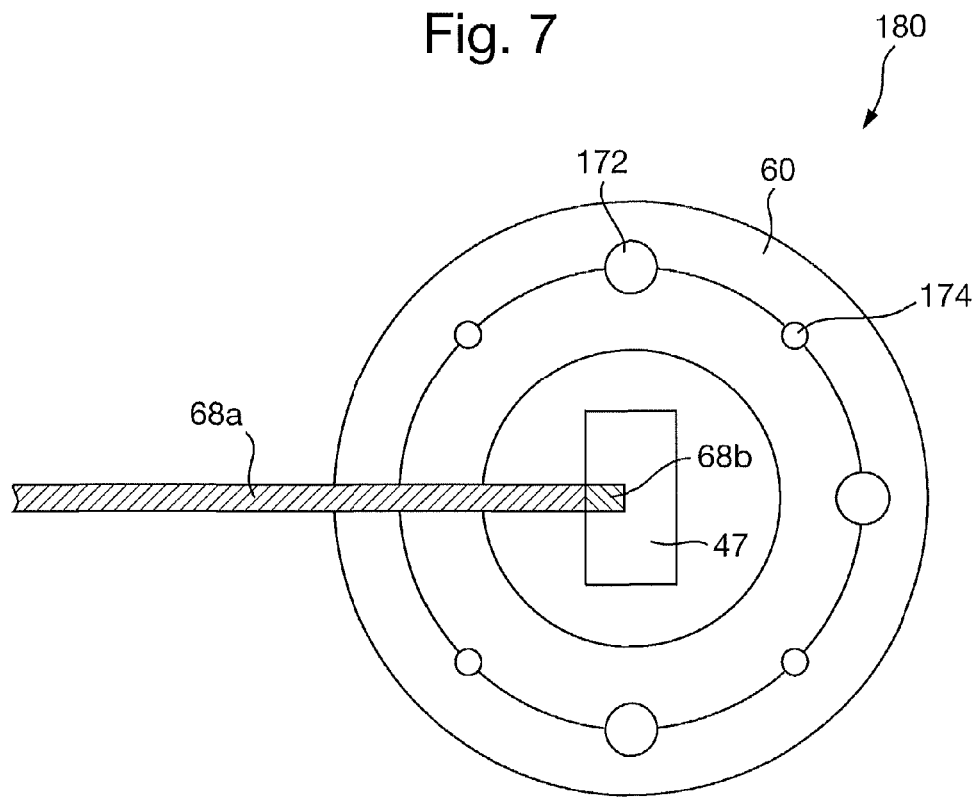

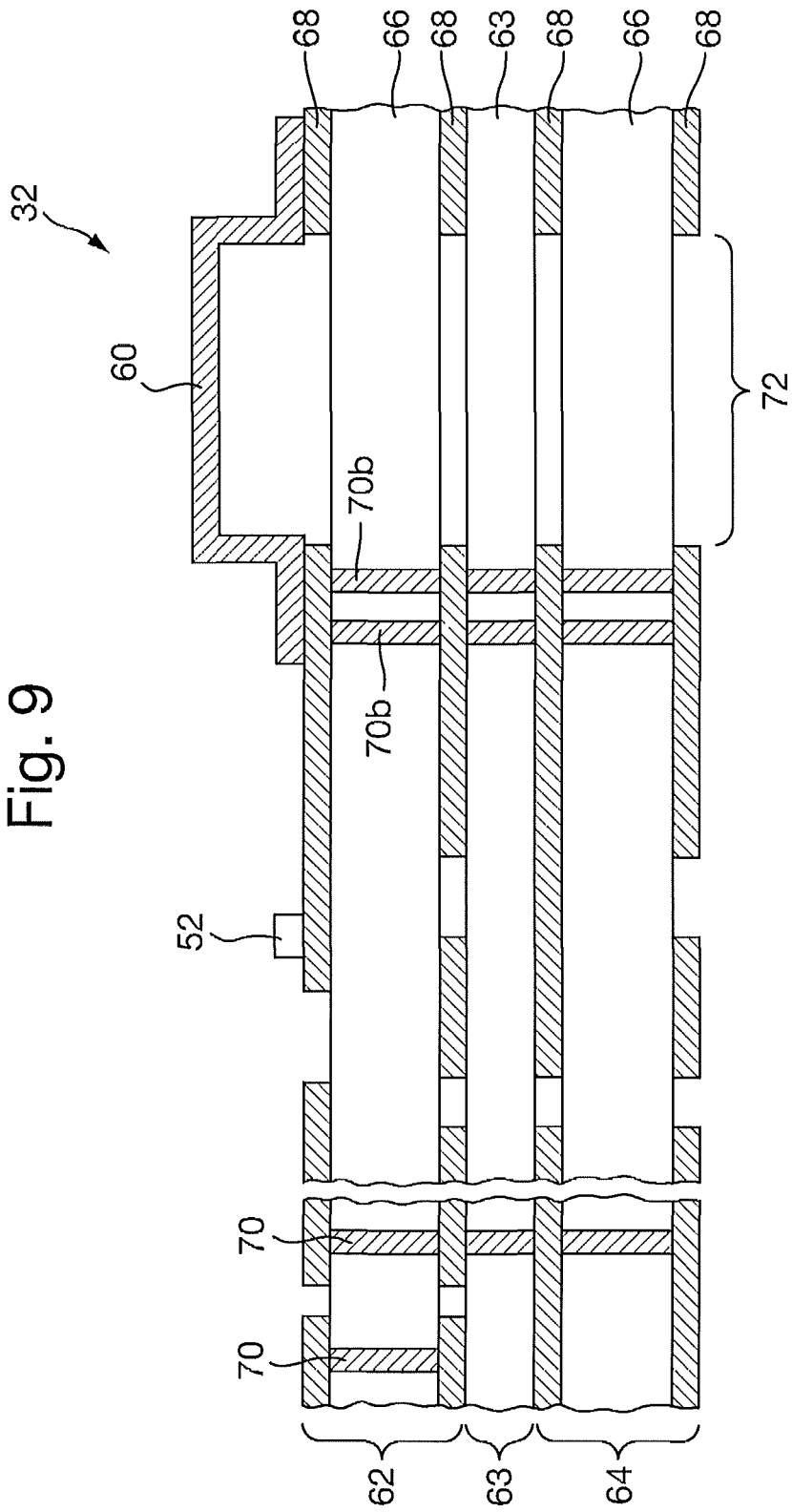

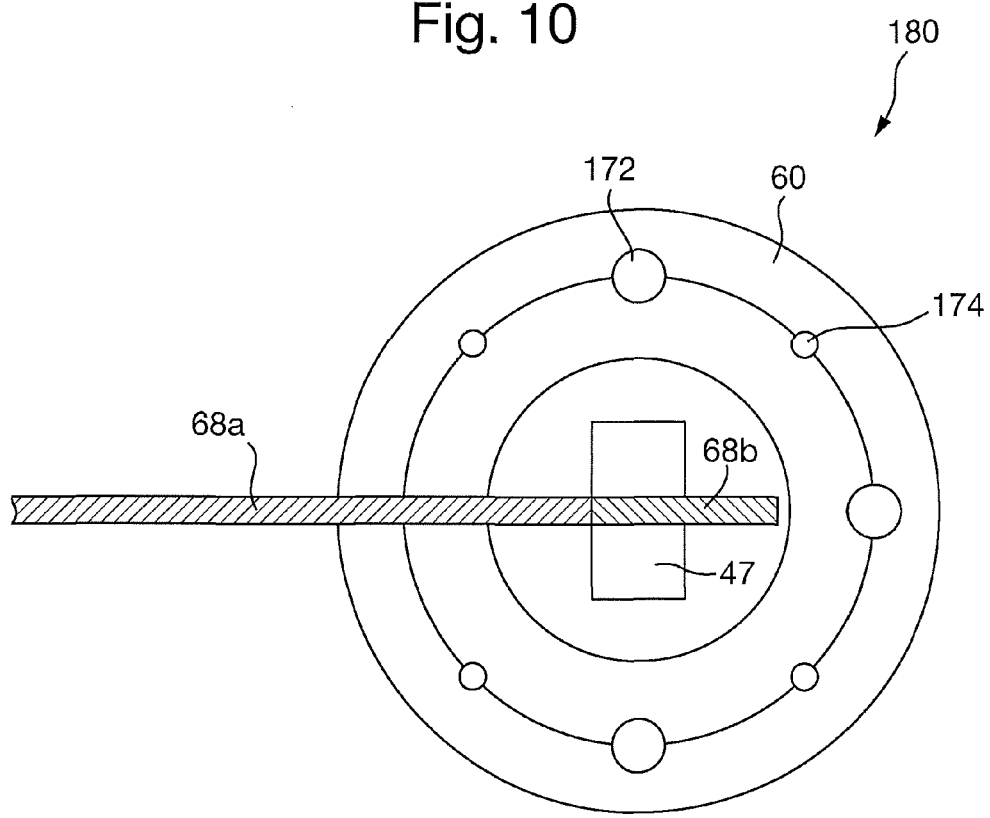

RADIO FREQUENCY COMMUNICATION

FIELD OF THE INVENTION

The present invention relates to radio frequency (RF) communication. The present invention also relates to an analogue modem circuit for use between an RF receiver and a digital modem circuit. The present invention also relates to a carrier recovery method.

BACKGROUND

Radio frequency (RF) communication, including point-to-point RF communication, is well known.

For outside broadcasting applications, there are many scenarios where multiple communication units, each coupled to a respective television camera, are required to transmit video data to a central production communication unit (and sometimes operate bi-directionally, i.e. also receive video data transmitted by the central production communication unit).

It is known that transmissions in a frequency band of 57 to 64 GHz located around 60 GHz undergo strong atmospheric absorption, and that in the UK and other countries these frequencies form an "unlicensed band". The equipment however has to conform to the relevant regulatory technical specifications to ensure that interference is not provided to those operating within adjacent licensed bands. This frequency band is also potentially attractive for point-to-point communication due to the strong atmospheric absorption limiting interference from other signals. However, such characteristics also would conventionally lead to difficulties in achieving desired transmission distances for e.g. outside broadcast applications, especially if modulation, transmission and reception apparatus is desired to be relatively small in size for reasons of portability and so on. This difficulty is exacerbated by increasing video data rates, e.g. if it were desired to perform point-to-point transmission of uncompressed High Definition (HD) Serial Digital Interface (SDI) video signals (1.485 gigabits/second).

For example, conventional transmitter modules and receiver modules for interfacing transmitter and receiver integrated circuits (i.e. chips) and other elements, using discrete waveguide connections and the like, with commensurate stringent electromagnetic separation requirements at 60 GHz, tend to be bulky and cumbersome.

Also, with regard to achieving relatively long range performance (e.g. >1 km), conventional analogue modem designs typically limit performance when operating in a channel suffering from fading. An all digital modem solution may offer better performance but would have a number of disadvantages in terms of size, weight, power consumption and cost.

SUMMARY OF THE INVENTION

In a first aspect, the present invention provides an analogue modem circuit for use between a radio frequency, RF, receiver and a digital modem circuit; the analogue modem circuit comprising: inputs for receiving a baseband RF input signal from an RF receiver; an up-converter with frequency supplied by an up-converter voltage controlled oscillator, VCO; a down-converter with frequency supplied by a down-converter VCO; a Costas loop sub-module; and outputs for outputting baseband outputs from the down-converter to a digital modem circuit; wherein: the up-converter feeds the down-converter, and the Costas loop module performs Costas loop functionality on the output of the down-converter to control the up-converter VCO frequency output to thereby control modification of the rotation of the symbols of the baseband signal as it is up-converted and then down-converted to provide the baseband outputs.

At least one of the VCOs may be controlled dependent upon a residual frequency difference between the two VCOs at the output from the down-converter, at a time when the Costas loop functionality is being started.

The controlling may be performed at a first lock-in attempt of the Costas loop functionality.

The controlling may be performed at a recalibration stage of the Costas loop functionality.

The residual frequency difference may be determined when holding the baseband inputs at fixed levels, representing a fixed symbol.

The analogue modem circuit may further comprise a complex baseband filter with a constant frequency-amplitude slope, wherein the residual frequency is determined by comparing signal levels before and after the filter.

In a further aspect, the present invention provides a carrier recovery method performed by an analogue modem circuit for use between a radio frequency, RF, receiver and a digital modem circuit; the method comprising: receiving a baseband RF input signal from an RF receiver at inputs of the analogue modem circuit; an up-converter voltage controlled oscillator, VCO, supplying a frequency to an up-converter; a down-converter VCO supplying a frequency to a down-converter; the up-converter feeding the down-converter; a Costas loop module performing Costas loop functionality on the output of the down-converter to control the up-converter VCO frequency output to thereby control modification of the rotation of the symbols of the baseband signal as it is up-converted and then down-converted to provide baseband outputs; and outputs of the analogue modem circuit outputting the baseband outputs.

At least one of the VCOs may be controlled dependent upon a residual frequency difference between the two VCOs at the output from the down-converter, at a time when the Costas loop functionality is being started.

The controlling may be performed at a first lock-in attempt of the Costas loop functionality.

The controlling may be performed at a recalibration stage of the Costas loop functionality.

The residual frequency difference may be determined when holding the baseband inputs at fixed levels, representing a fixed symbol.

The residual frequency difference may be determined by comparing signal levels before and after a complex baseband filter.

In a further aspect, the present invention provides one or more processors arranged to operate in accordance with the method of any of the above or below aspects.

In a further aspect, the present invention provides an analogue modem circuit and carrier recovery method for use between an RF receiver and a digital modem circuit; comprising: receiving a baseband RF input signal; an up-converter with frequency supplied by an up-converter voltage controlled oscillator, VCO; a down-converter with frequency supplied by a down-converter VCO; a Costas loop sub-module; and outputting baseband outputs from the down-converter to a digital modem circuit; wherein: the up-converter feeds the down-converter, and the Costas loop module performs Costas loop functionality on the output of the down-converter to control the up-converter VCO frequency output to thereby control modification of the rotation of the symbols of the baseband signal.

One or both VCOs may be controlled dependent upon a residual frequency difference between the VCOs when the Costas loop functionality is being started.

BRIEF DESCRIPTION OF THE DRAWINGS

FIG. 7 is a schematic (not to scale) illustration of a top plan view of a receiver transition arrangement;

FIG. 9 is a further schematic (not to scale) cross-sectional view of the RF board of the camera communication unit of FIG. 2;

FIG. 10 is a schematic (not to scale) illustration of a top plan view of a receiver transition arrangement;

DETAILED DESCRIPTION

Figure 1:
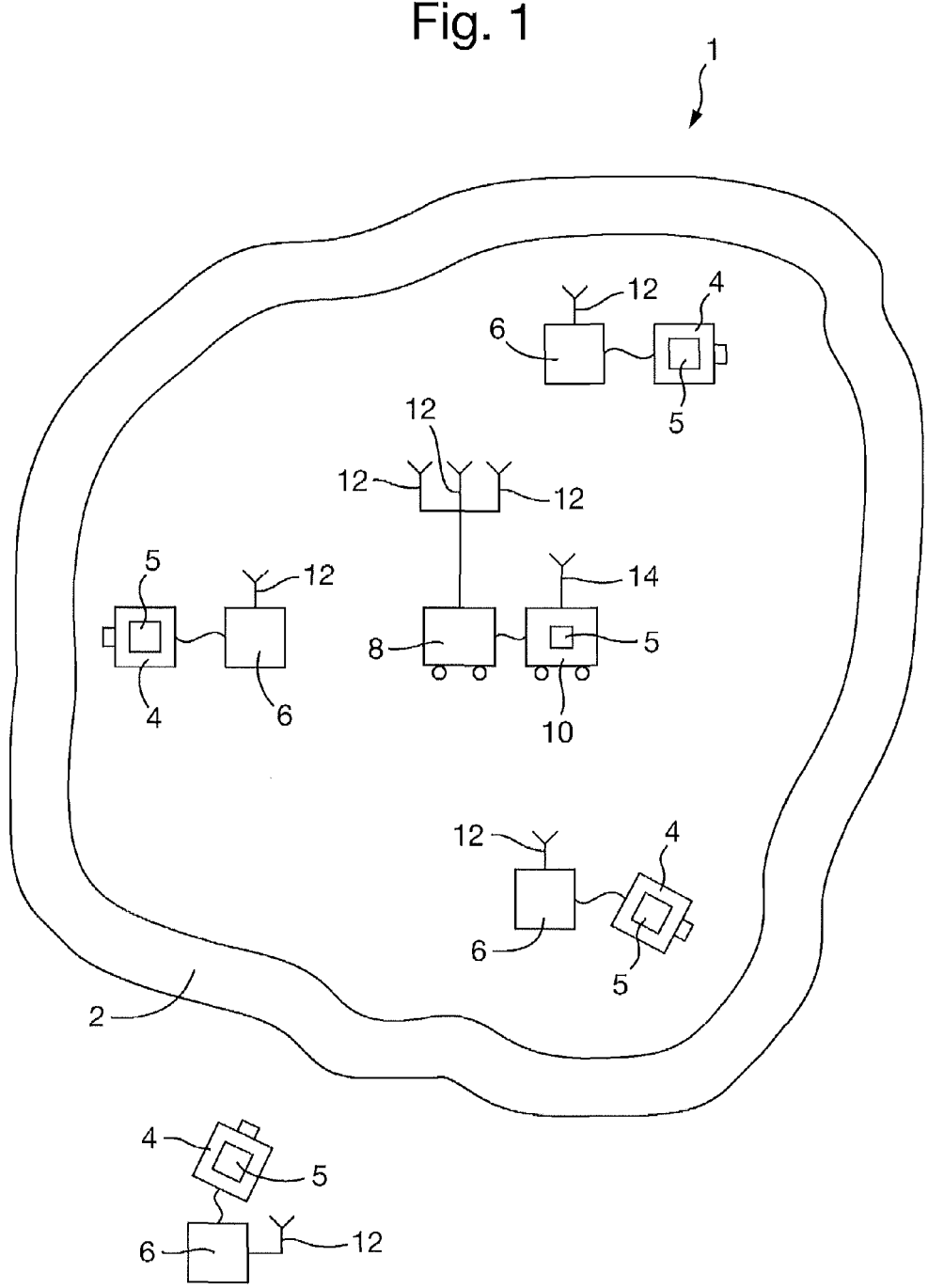
FIG. 1 is a schematic illustration (not to scale) of an example outside broadcast scenario in which a wireless communication system may be used.

FIG. 1 is a schematic illustration (not to scale) of an example outside broadcast scenario in which a first embodiment of a wireless communication system 1 may be used. In this scenario, the outside broadcast is of a motor sport race held over a racetrack 2. The wireless communication system 1 comprises a plurality of television cameras 4. Each television camera 4 comprises, in addition to video camera functionality, a respective display 5. Each television camera 4 and display 5 is coupled to a respective camera wireless communication unit 6. (In other embodiments, for some or all of the television camera 4—camera communication unit 6 pairs, the display 5 may be separate from the television camera 4 and instead coupled directly to the camera communication unit 6. In other embodiments, some or all of the of the television camera 4—camera communication unit 6 pairs may not include or be coupled to a display for displaying received video signals, even if the camera communication unit 6 is capable of receiving and processing such signals).

The communication system 1 further comprises a production wireless communication unit 8. The production communication unit 6 is coupled to a broadcast unit 10. The broadcast unit 10 comprises, in addition to broadcast functionality, a display 5. The camera communication units 6 each comprise a respective antenna 12, and in this embodiment the production communication unit 8 comprises a plurality of antennas 12. In this embodiment the production communication unit 8 is mounted in a vehicle and its antennas 12 are mounted on an extending hoist part of the vehicle and the broadcast unit 10 is also mounted in a vehicle.

In operation, video signals (in this example pictures and sound) captured by each television camera 4 are transmitted from its respective camera communication unit 6 via its antenna 12, at frequencies in the region of 60 GHz, in this example at uncompressed HD video data rates (1.485 gigabits/second), and received by the production communication unit 8 via a respective antenna 12 for each transmitting camera communication unit 6. The production communication unit 8 forwards the signals via (in this embodiment) a wired or optical fibre link to the broadcast unit 10. The broadcast unit 10 processes the signals, and/or records the signals, and/or transmits the signals (or processed versions thereof) onwards to a further destination entity, for example a main television studio using, for example, a satellite antenna 14 or optical fibre cable.

In this embodiment, the communication system 1 is bidirectional, i.e. in addition to the above described operation, the production communication unit 8 may transmit video signals via its antenna 12 which are received by the camera communication units 6 via their respective antennas 12, at frequencies in the region of 60 GHz, and in this example using standard definition (SD) SDI video data rates (270 megabits/second). Images defined by such video signals may be displayed by the respective display 5.

In this embodiment, the communication system 1 is able to achieve such bidirectional high data rate communication over relatively large distances between each camera communication unit 6 and the production communication unit 8, thereby satisfying the requirement for a large area event such as a motorsport race. For example, in this embodiment a distance between camera communication unit 6 and production communication unit 8 of 1 km is readily accommodated.

Figure 2:
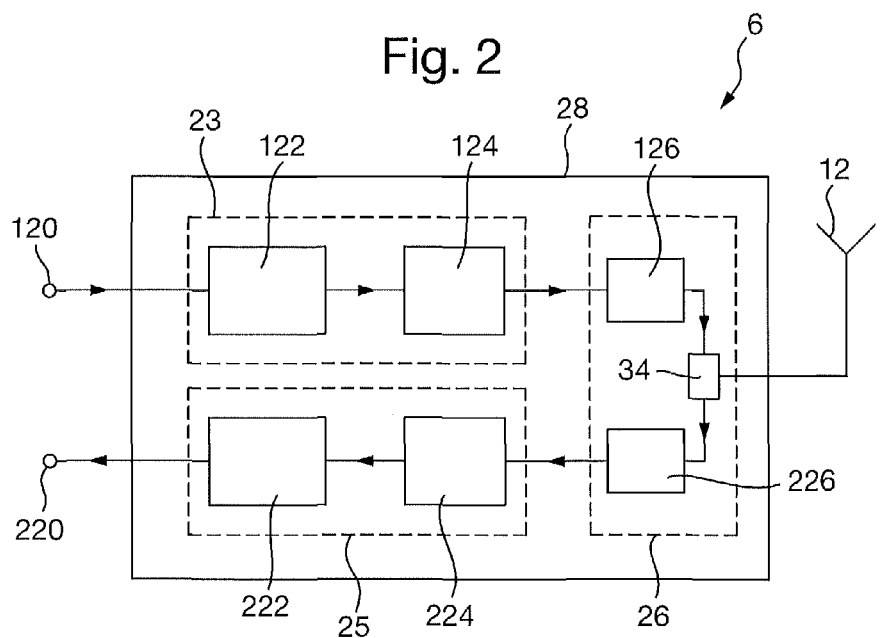
FIG. 2 is a schematic block diagram of certain details of a camera communication unit of the wireless communication system of FIG. 1.

FIG. 2 is a schematic block diagram of certain details of a camera communication unit 6 of the communication system 1. It is noted that FIG. 2 and the description thereof is equally applicable to the production communication unit 8, except where stated otherwise.

The camera communication unit 6 comprises a video input 120, a video output 220, a transmit modem 23, a receive modem 25, a radio frequency transceiver 26 for operation in a frequency band extending around 60 GHz, and the above mentioned antenna 12.

The transmit modem 23 comprises a transmit modem digital circuit 122 and a transmit modem analogue circuit 124. The receive modem 25 comprises a receive modem digital circuit 222 and a receive modem analogue circuit 224. The transceiver 26 comprises a transmitter circuit 126, a receiver circuit 226, and a diplexer 34.

Figure 3:
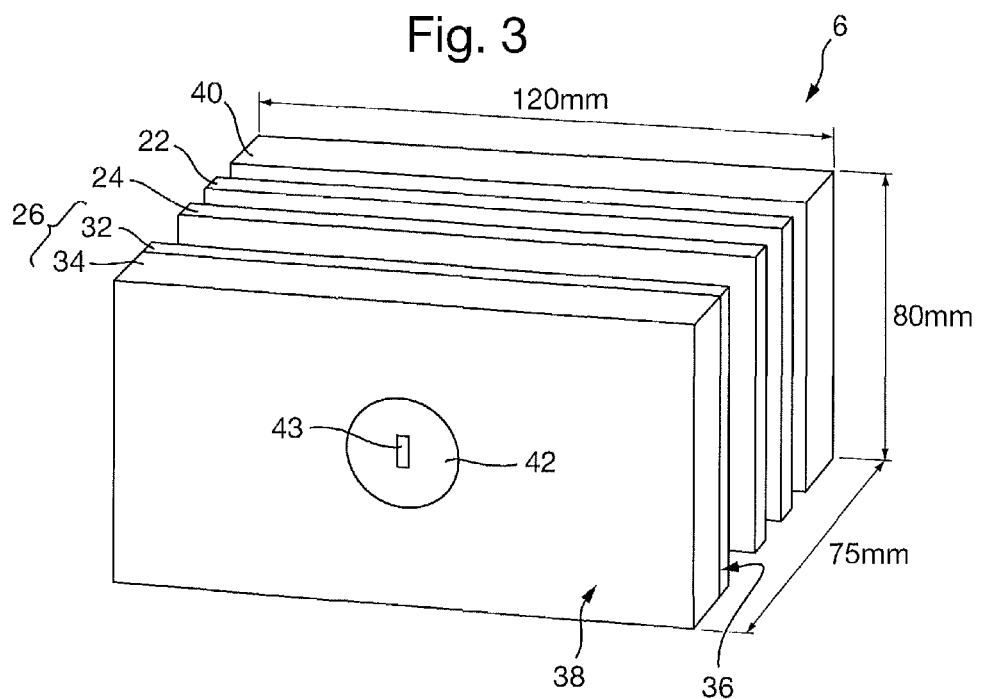
FIG. 3 is a simplified schematic illustration (not to scale) of the main physical constructional details of the camera communication unit of FIG. 2.

In this embodiment, at least the majority of the components of both modem digital circuits, i.e. the transmit modem digital circuit 122 and the receive modem digital circuit 222, are mounted on a single circuit board, namely a digital modem board 22 (shown in FIG. 3). Also, in this embodiment, at least the majority of the components of both modem analogue circuits, i.e. the transmit modem analogue circuit 124 and the receive modem analogue circuit 224, are mounted on a further single circuit board, namely an analogue modem board 24 (shown in FIG. 3). The transmit modem 23, the receive modem 25, and the transceiver 26 are physically mounted in an enclosure 28, and the antenna 12 is electrically coupled to the transceiver 26 and physically mounted on the enclosure 28.

The video input 120 is for coupling to the television camera 4. The video input 120 is further coupled to the transmit modem digital circuit 122. The transmit modem digital circuit 122 is further coupled to the transmit modem analogue circuit 124. The transmit modem analogue circuit 124 is further coupled to the transmitter circuit 126. The transmitter circuit 126 is further coupled to the diplexer 34. The diplexer 34 is further coupled to the antenna 12.

The video output 220 is for coupling to the display 5. The video output 220 is further coupled to the receive modem digital circuit 222. The receive modem digital circuit 222 is further coupled to the receive modem analogue circuit 224. The receive modem analogue circuit 224 is further coupled to the receiver circuit 226. The receiver circuit 226 is further coupled to the diplexer 34. A mentioned in the preceding paragraph, the diplexer 34 is further coupled to the antenna 12.

In overview, in the transmission part of the operation of the camera communication unit 6, an SDI digital video signal from the television camera 4 is input via the video input 120 to the transmit modem digital circuit 122. The transmit modem digital circuit 122 performs error correction coding and framing of the input SDI video signal suitable for the modulation that is to follow in the transmit modem analogue circuit 124, and passes the resulting processed signal to the transmit modem analogue circuit 124. The transmit modem analogue circuit 124 modulates the digital signal to produce an analogue baseband differential in-phase (I) and differential quadrature (Q) Quadrature Phase Shift Keying (QPSK) signal in a form suitable for the transmitter circuit 126, and passes the resulting analogue baseband I and Q signals to the transmitter circuit 126. The transmitter circuit 126 converts the analogue I and Q signals to an approximately 60 GHz RF signal and transmits this signal via the diplexer 34 and antenna 12 (to the production communication unit 8 via a free space link).

Again in overview, in the reverse sense, i.e. in the reception part of the operation of the camera communication unit 6, an approximately 60 GHz RF signal transmitted by the production communication unit 8 is received by the receiver circuit 226 via the antenna 12 and diplexer 34. The receiver circuit 226 converts the approximately 60 GHz RF signal to analogue differential baseband I and Q signals, and passes this baseband signal to the receive modem analogue circuit 224. The receive modem analogue circuit 224 converts that signal to a form suitable for the receive modem digital circuit 222 to operate on, and passes the resulting modulated analogue signal to the receive modem digital circuit 222. The receive modem digital circuit 222 processes that signal to a digital form suitable for display (for example to display to an operator of the television camera 4 the video image currently being selected for broadcast transmission to the public), and passes the resulting digital signal to the video display 5 that in this embodiment is comprised by the television camera 4.

In the case of the production communication unit 8 (as opposed to the camera communication units 6), the video input 120 and video output 220 are connected to the broadcast unit 10 and its display 5 rather than to one of the television cameras 4.

FIG. 3 is a simplified schematic illustration (not to scale) of the main physical constructional details of the camera communication unit 6 of this embodiment. As mentioned above, at least the majority of the circuitry for both the transmit modem digital circuit 122 and the receive modem digital circuit 222 is provided on a common given single board 22, namely the digital modem board 22. Also as mentioned above, at least a majority of the circuitry for both the transmit modem analogue circuit 124 and the receive modem analogue circuit 224 is provided on a further common given board 24, namely the analogue modem board 24. The transceiver 26 is implemented in the form of a laminated structure comprising an RF board 32 (on which are mounted at least the majority of the components forming the transmitter circuit 126 and the receiver circuit 226) and the diplexer 34 (a diplexer being a passive device that provides frequency domain multiplexing/de-multiplexing functions). In this embodiment the diplexer 34 is formed from, and has the outer dimensions of, a rectangular shaped solid block or slab. In this embodiment the slab, i.e. the diplexer 34, is made of aluminium finished with an Iridite (trademark) surface finish. The laminated structure is provided by the RF board 32 being bonded in laminated fashion to a surface of the diplexer 34. For convenience (i.e. this is not limiting), this surface is hereinafter referred to as the "inner diplexer surface 36" (i.e. the term "inner" being in terms of the construction of the camera communication unit 6). In this embodiment the camera communication unit 6 further comprises a separate power supply board 40 that provides power for each of the digital modem 22, the analogue modem 24 and the RF board 32.

The surface 38 of the diplexer 34 that is opposite the inner diplexer surface 36 is hereinafter referred to as the "outer diplexer surface 38". The diplexer 34 further comprises a common port 42 provided at the outer diplexer surface 38. The common port 42 comprises fixing means and a common port waveguide opening 43. The common port waveguide opening 43 is an opening to a waveguide structure within the diplexer 34, which waveguide structure will be described later below.

The antenna 12 (for clarity not shown in FIG. 3) is mounted in proximity to the outer diplexer surface 38 and aligned with the common port 42 such that in operation the antenna 12 is coupled to the common port waveguide opening 43. In this embodiment the antenna 12 is a dielectric loaded horn antenna of diameter 250 mm and length 400 mm. However, this need not be the case, and in other embodiments other types of antenna and/or other sizes of antenna may be used. For example, a more compact antenna may be provided in the form of a twist reflect or transreflect antenna.

In this embodiment, the following items are held in a stacked, spaced apart arrangement in the enclosure 28 in the following order (with appropriate interconnections (not shown) provided between these different elements): the power supply board 40—the digital modem (board) 22—the analogue modem (board) 24—the transceiver (laminated structure) 26. The antenna 12 is mounted on the outside of the enclosure 28 with coupling to the common port 42 arranged as described above. In this embodiment the physical sizes of the various elements are such that, as indicated in FIG. 3, each of these elements has a surface area of width approximately 120 mm and height approximately 80 mm, with the stacked elements providing an overall depth when stacked (including gaps between the elements) of approximately 75 mm. The 75 mm total depth is made up approximately of the following individual thicknesses/gaps: diplexer 34=10 mm, RF board 32=10 mm, gap=5 mm, analogue modem 24=10 mm, gap=5 mm, digital modem 22=10 mm, gap=5 mm, power supply board 40=20 mm. Accordingly, the enclosure 28 need only be of approximate size 160 mm×120 mm×80 mm.

Figure 4:
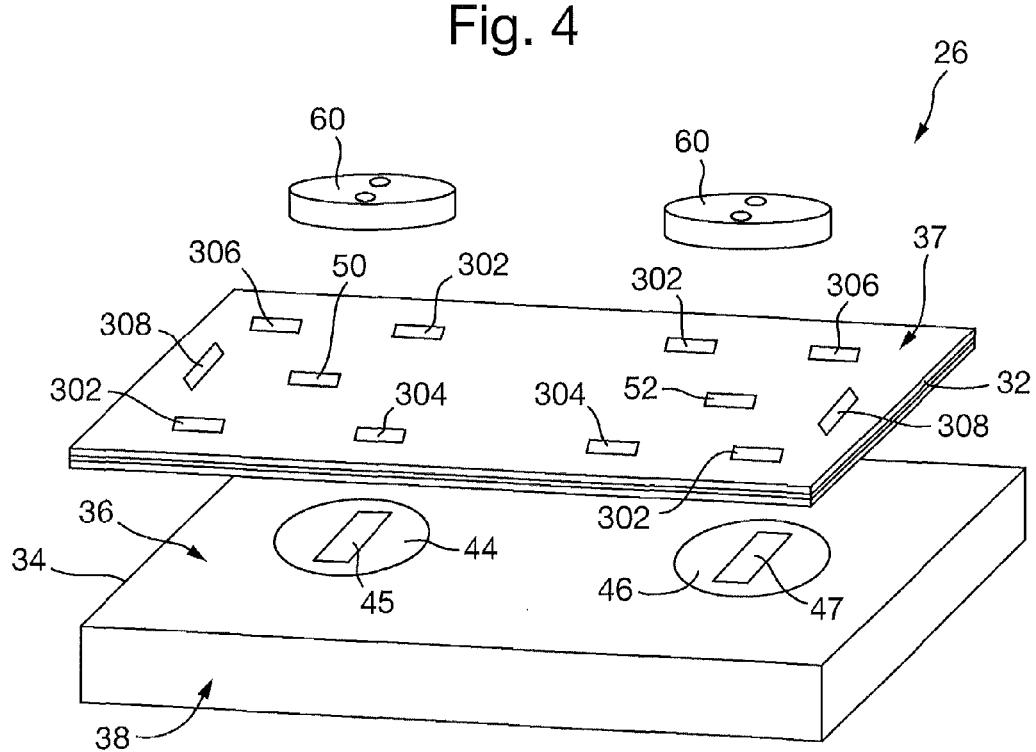
FIG. 4 is a simplified exploded-view schematic illustration (not to scale) showing further details of certain constituent parts of a transceiver of the camera communication unit of FIG. 2.

FIG. 4 is a simplified exploded-view schematic illustration (not to scale) showing further details of certain constituent parts of the RF transceiver 26 of this embodiment, and representing schematically the order in which the various elements are assembled (this aspect will be summarised at the end of the description of FIG. 4). The same reference numerals are used to indicate the same components where these have been mentioned previously above.

In addition to the earlier described common port 42 on the outer diplexer surface 38, the diplexer 34 further comprises two ports on the inner diplexer surface 36, namely (for ease of reference—either port may in fact be used for either application) a transmitter port 44 and a receiver port 46. The transmitter port 44 comprises fixing means and a transmitter port waveguide opening 45. The transmitter port waveguide opening 45 is a further opening to the previously mentioned waveguide structure that will be described later below. The receiver port 46 comprises fixing means and a receiver port waveguide opening 47. The receiver port waveguide opening 47 is a further opening to the previously mentioned waveguide structure that will be described later below.

The RF board 32 comprises a transmitter integrated circuit (IC) chip 50 and a receiver IC 52 mounted directly on the surface 37 of RF board 32 that faces away from the diplexer 34. The transmitter IC 50 and the receiver IC 52 are mounted at positions that are approximately aligned with the positions of the transmitter port 44 and the receiver port 46 respectively. Wire or tape bonds are used to interconnect the transmitter IC 50 and the receiver IC 52 with transmission lines etched on the surface of the RF board 32. Additional supporting surface mount (SM) components are also mounted on the surface 37 of the RF board 32, these include: power supply regulators 302, crystal oscillators 304, digital serial control interface buffers 306, and multi-way interface connectors 308. The components mounted on the RF board 32 provide, in combination, and where required with other conventional components, the transmitter circuit 126 and the receiver circuit 226.

Two covers 60 (in this embodiment made of metal) are also positioned on the surface 37 of the RF board 32. They are positioned over internal structures within the RF board called transitions (not shown in FIG. 4) that will be described later below.

In other embodiments, instead of using a transmitter IC 50 and a receiver IC 52, the transmitter circuit 126 and the receiver circuit 226 are implemented in the form of discrete components mounted on the surface 37 of the RF board 32.

In this embodiment, the order in which the various elements described above are assembled is as follows. First, the diplexer 34 is provided. Then the bare form of the RF board 32 is bonded to the diplexer 34. Then the various components (other than the transmitter IC 50 and the receiver IC 52) are mounted on to the surface 37 of the RF board 32. Then the transmitter IC 50 and the receiver IC 52 are mounted on to the surface 37 of the RF board 32. Then the covers 60 are mounted on to the surface 37 of the RF board 32.

Figure 5:
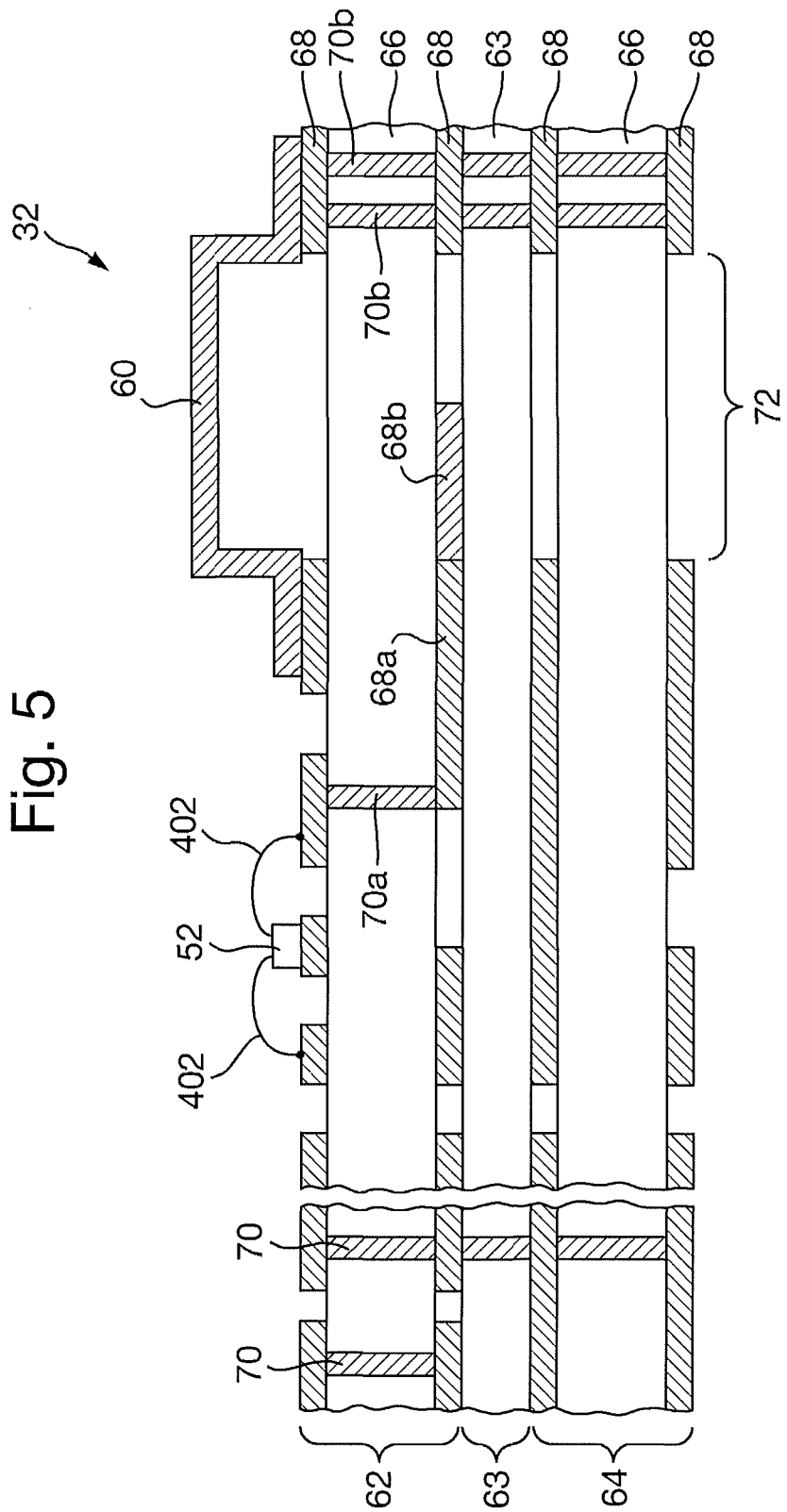
FIG. 5 is a simplified schematic illustration (not to scale) showing further details of an example length (in cross-section) of an RF board of the camera communication unit of FIG. 2.

FIG. 5 is a simplified schematic illustration (not to scale) showing further details of an example length (in cross-section) of the RF board 32 of this embodiment. The same reference numerals are used to indicate the same components where these have been mentioned previously above.

In this embodiment the RF board 32 comprises a laminated structure made up of two double-sided copper clad printed circuit boards (pcb), namely an "upper" (this term is used for convenience and is not limiting) double-sided pcb 62 and a "lower" (this term is used for convenience and is not limiting) double-sided pcb 64, with a bond ply adhesive layer 63 positioned between the two double-sided pcbs 62, 64 which is used to bond together the two double-sided pcbs 62, 64. Each of the double-sided pcbs 62, 64 comprises a 100 μm thick board structure made of liquid crystal polymer (LCP) with 17 μm thick copper layers 68 on each of the two planar surfaces. The bond ply adhesive layer 63 comprises a 50 μm thick dielectric structure. Conducting vias (merely by way of example certain such vias 70, 70a, 70b are shown in FIG. 5) are provided between copper layers 68 as required to provide the required interconnectivity. Some of the via structures are arranged as grounding posts by appropriately connecting/isolating them from one or more of the copper layers 68. The vias 70b are examples of these grounding posts.

Also shown in FIG. 5 is the receiver IC 52 bonded on the upper copper double-sided pcb 62. Wire or tape bonds 402 are used to interconnect the individual connection pads on the receiver IC 52 to the copper track 68. One in particular is connected to the track connected to a via 70a that passes to the opposing copper layer 68 of the upper double-sided pcb 62. At the via exit the via 70a is connected to a track section of the copper track 68. This track section is a continuous section of track, but for ease of explanation and in view of the two following portions different functionality, will be named or identified as a track section 68a that extends away from the via 70a, and then an "RF probe element" track section 68b that extends from the track section 68a (note, the RF probe element track section may also be called an RF coupling element track section). In other words, the track section 68b provides/functions as an RF probe element (which may also be called an RF coupling element). The RF probe element track section 68b operates with the coupling function of an RF probe element (here to couple the signal from the relevant waveguide of the diplexer to the track section 68a and hence on to the receiver IC 52) by virtue of the following isolation details and by virtue of being positioned (as described in more detail below) in alignment with the waveguide opening so as to couple with the waveguide opening. The copper tracks 68 on both sides of the lower double-sided pcb 64 are removed over an area of the lower double-sided pcb 64 corresponding approximately to the area of the corresponding waveguide, to thereby provide an area or region 72 of the lower double-sided pcb 64 where the lower double-sided pcb 64 acts as an insulator. A corresponding arrangement (not shown) is provided for a connection or connections (in the case of differential transmission) from the transmitter IC 50. These arrangements (be they reception or transmission) may be termed transitions.

Also shown in FIG. 5 is one of the covers 60, mounted on the outer surface of the first double-sided pcb 62. The cover 60 is positioned in alignment with the above described transition, i.e. above the region 72 and therefore also above the RF probe element track section 68b, and is grounded. The interior of the cover 60 thereby provides an air space at the top of the transition arrangement. This air space is provided as a specific distance between the RF probe element track section 68b and the cover 60 in terms of the wavelength of the approximately 60 GHz operation (in this embodiment the distance is wavelength/4) to provide part of the transmitting or receiving functionality of the transition.

The RF board 32 is aligned with the diplexer 34 such that the RF probe element track section 68b is aligned with the receiver port waveguide opening 47 of the diplexer 34, so that in operation the receiver IC 52 is coupled to the receiver port waveguide opening 47 (as described in more detail below with reference to FIG. 7). Corresponding track section or sections (as described in more detail below, for example with reference to FIG. 11) is/are aligned with the transmitter port waveguide opening 45 of the diplexer 34, so that in operation the transmitter IC 50 is coupled to the transmitter port waveguide opening 45.

Figure 6A:
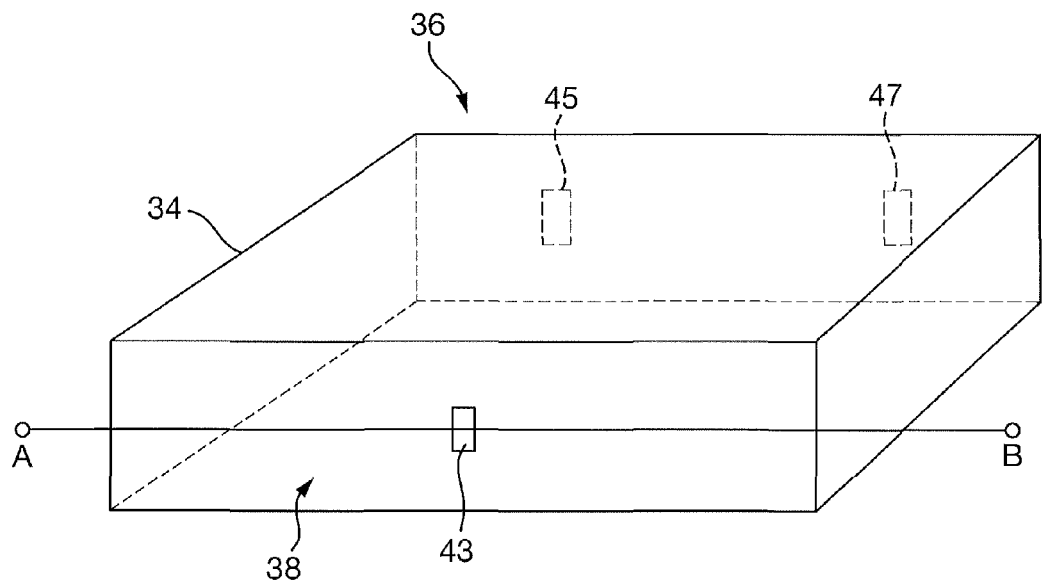
FIG. 6A is a perspective view of a diplexer of the camera communication unit of FIG. 2.
Figure 6B:
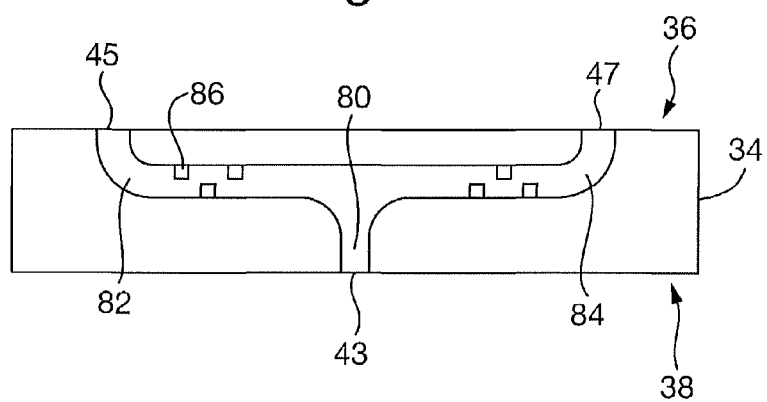
FIG. 6B shows (schematically and not to scale) a cross-sectional view of the internal features of the diplexer of FIG. 6A.

FIGS. 6A and 6B are schematic illustrations (not to scale—indeed the aspect ratio is shown in a very distorted fashion to enable the various elements to be seen clearly) showing certain further details of the diplexer 34, and in particular the waveguide structure mentioned previously above. The same reference numerals are used to indicate the same components where these have been mentioned previously above.

FIG. 6A is a perspective view of the diplexer 34, showing for ease of reference in one figure the following previously described elements: the common port waveguide opening 43 (at the outer diplexer surface 38), the transmitter port waveguide opening 45 (at the inner diplexer surface 36), and the receiver port waveguide opening 47 (also at the inner diplexer surface 36). The transmitter port waveguide opening 45 and the receiver port waveguide opening 47 are spaced apart from each other. In this embodiment, each of the waveguide openings 43, 45, 47 are located on the same centre line (in terms of the height of the diplexer 34) as each other, more particularly they are located half-way up the respective diplexer surface 38, 36, at a height position indicated schematically by the reference line "A-B" in FIG. 6A. However, this need not be the case, and in other embodiments any one or more of the openings may be at a different height position.

FIG. 6B shows (schematically and not to scale) a cross-sectional view of the internal features of the diplexer 34 in the plane defined by the line A-B.

The diplexer 34 comprises an air filled/hollow waveguide structure therein, i.e. the waveguide structure is machined or otherwise integrated within the solid block that forms the diplexer 34. The diplexer consists of three waveguide sections: a transmitter waveguide 82, a receiver waveguide 84 and a waveguide combiner 80, that interface with the transmitter port waveguide opening 45, the receiver port waveguide opening 47, and the common port waveguide opening 43 respectively. This waveguide structure is the structure previously mentioned in the description of FIGS. 3 and 4.

Apart from where they need to be shaped differently to merge etc., the transmitter waveguide 82, the receiver waveguide 84, and the waveguide combiner 80 each have rectangular cross-section and are configured to provide openings/interfaces 45, 47 and 43 conforming to the waveguide standard "WG25". In consequence, the three waveguide openings 43, 45, 47 are each of rectangular shape also. However it is not essential that this particular shape/size of waveguide is employed, and in other embodiments other cross-sections, sizes and/or types may be employed instead.

In this embodiment, the waveguide structure 80 is at the same height (in terms of the height of the diplexer 34) as the waveguide openings 43, 45, 47, i.e. is located half-way up the respective diplexer surface 38, 36, at all of its extent across the diplexer 34. However, this need not be the case, and in other embodiments its height may vary, i.e. it need not remain fixed in any given plane.

In this embodiment, the transmitter waveguide 82, the receiver waveguide 84 and the waveguide combiner 80 are machined to provide different passband frequency filter characteristics by machining such as to provide filters 86 in the form of protrusions on the surfaces of the waveguide walls. However, this is not essential, and in other embodiments other ways or constructions for providing filtered operation may be used instead.

In this embodiment, the transmitter waveguide 82 is tuned to a preferred frequency passband of 57.895 GHz to 58.105 GHz and the receiver waveguide 84 is tuned to a preferred frequency passband of 61.94 GHz to 63.06 GHz. Alternatively these frequencies may be reversed, i.e. the receiver tuned to 57.895 GHz to 58.105 GHz and the transmitter tuned to 61.94 GHz to 63.06 GHz Moreover, these particular frequencies values are not essential, and in other embodiments other frequencies in the region of 60 GHz may be used instead.

In this embodiment the waveguide structure is formed in the solid block of the diplexer 34 by machining the solid block to hollow out the waveguide structure. The machining is controlled, or further machining is performed, to provide the filters 86.

FIG. 7 is a schematic (not to scale) illustration of a top plan view of a receiver transition arrangement 180. The receiver transition arrangement 180 of FIG. 7 corresponds to various parts of the structure described earlier, and in particular with the layout of various parts shown together also in FIG. 5. The same reference numerals are used to indicate the same components where these have been mentioned previously above.

Certain of the elements providing the receiver transition arrangement 180 are the following: the track section 68a and its end section which is the RF probe element track section 68b, the receiver port waveguide opening 47, and the cover 60. (Also shown in FIG. 7 are the positions of fixing screws 172 and location dowel pins 174 which are used for locating and fixing the cover 60 to the RF board 32.) The RF probe element track section 68b is positioned such as to start at the aligned position of the receiver port waveguide opening 47 at approximately the mid-point of the longer side of the receiver port waveguide opening 47 and then continue on so as to extend over approximately half the width of the receiver port waveguide opening 47 where it ends in an open circuited transmission line.

Figure 8:
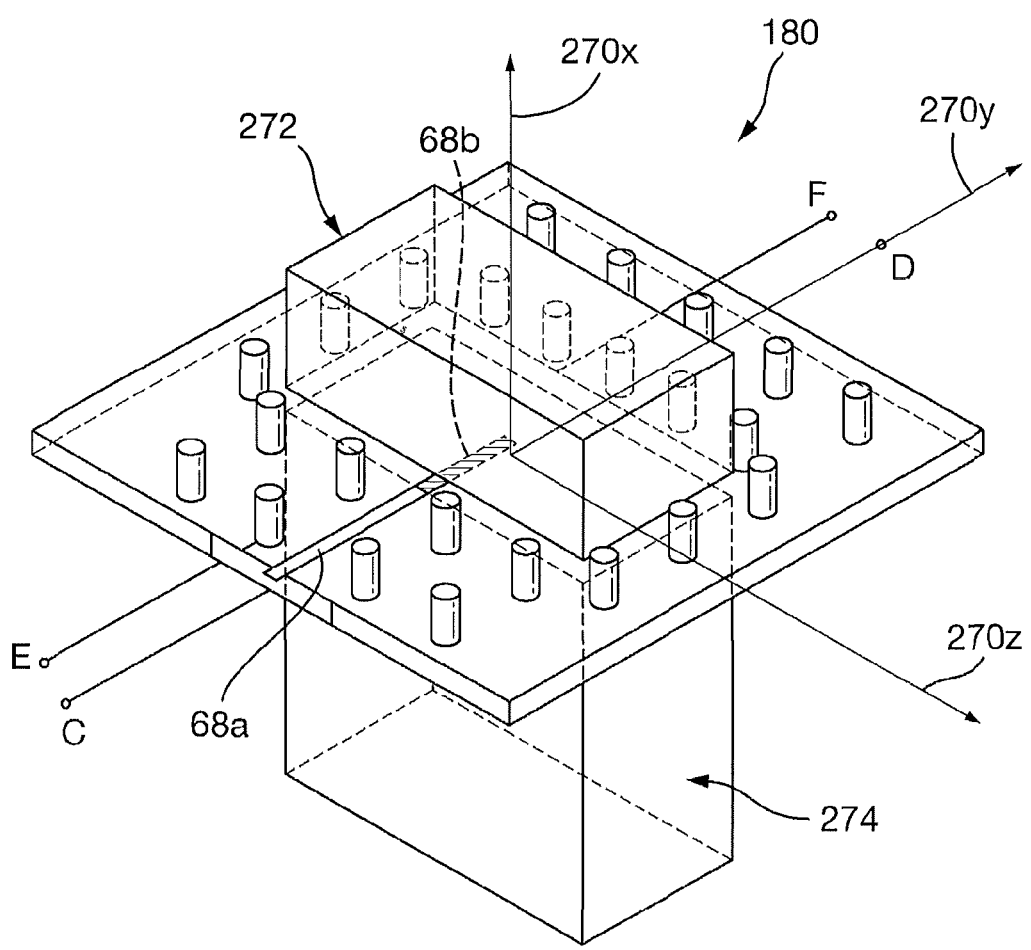
FIG. 8 is a schematic (not to scale) perspective illustration of certain elements of the receiver transition arrangement of FIG. 7.

FIG. 8 is a schematic (not to scale) perspective illustration of certain elements of the receiver transition arrangement 180 described above with particular reference to FIGS. 5 and 7. FIG. 8 is derived from a three dimensional electromagnetic model and shows a mixture of certain structural details and certain modelling artefacts. The same reference numerals are used to indicate the same components where these have been mentioned previously above.

Accordingly, in FIG. 8 modelling x-y-z axes are shown for ease of reference, and these are indicated by reference numerals 270x, 270y and 270z. FIG. 8 further shows again the previously described track section 68a and its end section which is the RF probe element track section 68b. FIG. 8 also shows a plurality of grounding posts/grounded vias 70b. Also shown in FIG. 8 is the modelling artefact of the airspace 272 provided between the cover 60 and the outer surface of the upper double-sided pcb 62. Similarly, also shown in FIG. 8 is the modelling artefact of the airspace 274 (which is provided by the interior of the hollow receiver waveguide 84 shown previously in FIG. 6).

Two reference lines, namely C-D and E-F are provided on FIG. 8 for defining cross-sectional views that will be discussed below. The line C-D passes through and extends along the same direction as the track section 68a and RF probe element track section 68b. The line E-F extends in a direction parallel to line C-D, but passes through a different point of the Figure.

Referring back to FIG. 5, it can now be noted that FIG. 5 is a schematic (not to scale) cross-sectional view of the RF board 32 in the plane defined by the line C-D, although the range of the view in FIG. 5 extends further to the left than that in FIG. 8.

FIG. 9 is a schematic (not to scale) cross-sectional view of the RF board 32 in the plane defined by the line E-F. The same reference numerals are used to indicate the same components where these have been mentioned previously above.

It will be appreciated that the numbers of and positions of the grounding posts/grounded vias 70b in FIGS. 5, 8 and 9 are merely schematic and by way of example only. These should in practice be positioned and provided in appropriate quantities to provide appropriate grounding and prevention of parallel plate mode propagation. Conventional field mapping modelling tools may be used in the layout design process.

FIG. 10 is a schematic (not to scale) illustration of a top plan view of a receiver transition arrangement 180 used in a further embodiment. The same reference numerals are used to indicate the same components where these have been mentioned previously above. All details of this embodiment are the same as those described above, including how the arrangement of FIG. 10 is implemented within the different layers of the RF board 32 and so on, except for a variation in the probe element track section 68b as will now be explained in more detail.

In this further embodiment as shown in FIG. 10, the RF probe element track section 68b extends (again starting at approximately the mid-point of the longer side of the receiver port waveguide opening 47) across the whole width of the receiver port waveguide opening 47 plus a further short distance to form a shorted cross guide termination by then connecting to a grounded section of track (not shown). The length of the further short distance is accordingly one that provides the required transmission line termination characteristics.

If desired, e.g. for reasons of simplicity, the transmitter transition arrangement may be provided in corresponding detail to the above described possibilities for receiver transition arrangements. However, in this embodiment, the transmitter IC 50 uses a differential output and hence requires a different probe design than that described above for the single ended receiver probe design.

Figure 11A:
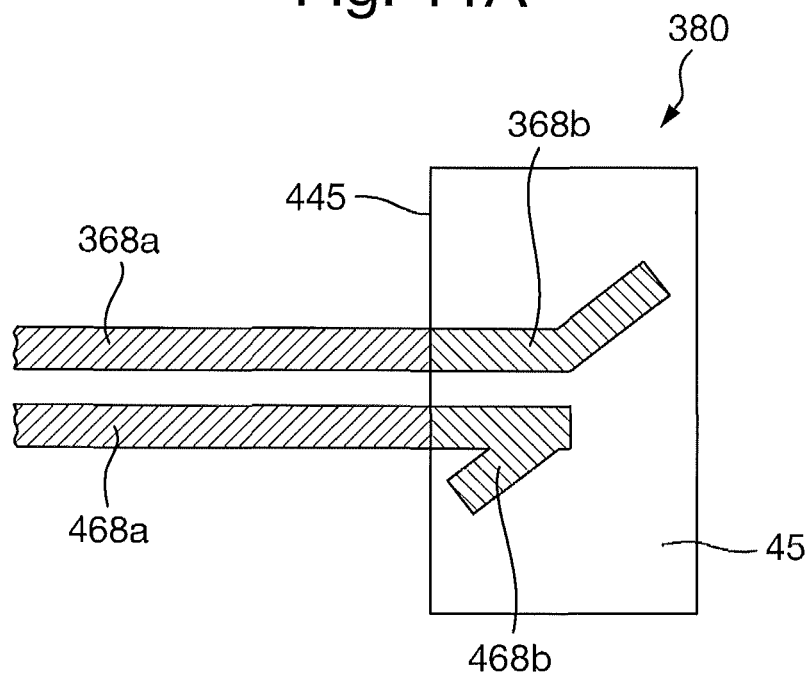
FIGS. 11A and 11B are schematic (not to scale) illustrations of a top plan view of a differential transmitter RF coupling element (which may also be called an RF probe element) transition arrangement.
Figure 11B:
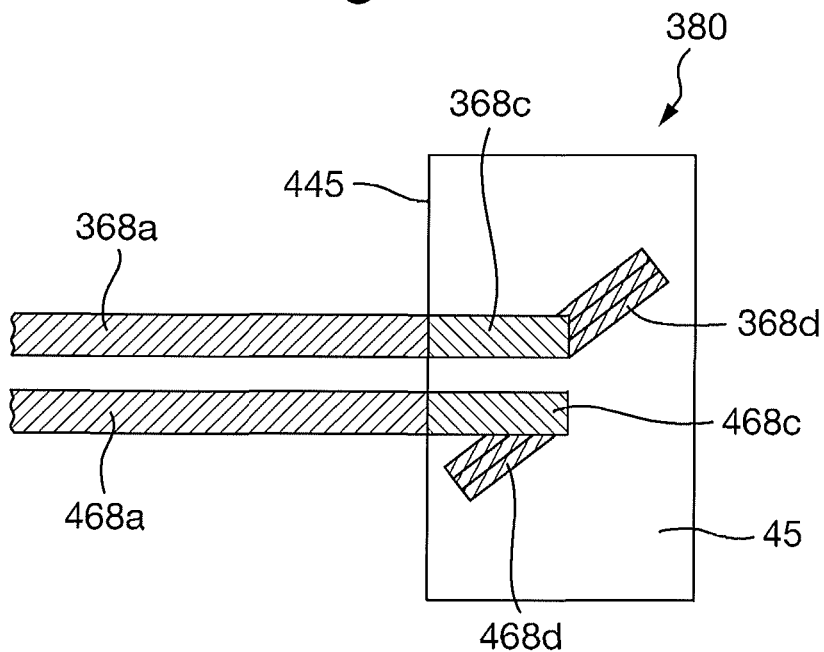

FIGS. 11A and 11B are schematic (not to scale) illustrations of a top plan view of a differential transmitter RF coupling element (which may also be called RF probe element) transition arrangement 380 that may be used in versions where the transmitter IC 50 has a differential output. FIGS. 11A and 11B are two drawings of a differential transmitter RF coupling element (RF probe element) transition arrangement 380, i.e. FIGS. 11A and 11B show the same arrangement as each other but have certain parts labelled differently in the two figures for ease of explanation, as will be understood from the following description. Also, for clarity, in FIGS. 11A and 11B certain features are omitted compared to those shown and labelled in corresponding FIGS. 7 and 10, and instead in FIGS. 11A and 11B the view shown concentrates on the relevant copper tracks and the transmitter port waveguide opening 45.

As shown in FIGS. 11A and 11B, there are two substantially parallel (although it is not essential they are substantially parallel) copper track sections 368a and 468a that extend to a side of the transmitter port waveguide opening 45 (hereinafter referred to as the first side 445 of the transmitter port waveguide opening). These copper track sections 368a, 468a are the two differential equivalents to the single (non-differential) track section 68a of the above described receiver transition arrangements.

As indicated by the reference numerals employed in the FIG. 11A representation of the differential transmitter RF coupling element (RF probe element) transition arrangement 380, the two copper tracks forming respectively copper track sections 368a, 468a then each extend further as continuous tracks, although the further extending parts will be referred to as specific sections of track, namely a first "RF coupling element" (or "RF probe element") track section 368b (the extending part of the copper track section 368a) and a second "RF coupling element" (or "RF probe element") track section 468b (the extending part of the copper track section 468a). Both the first RF coupling element track section 368b and the second RF coupling element track section 468b only extend within the area of their respective port waveguide opening, i.e. they are "contained" within their respective waveguide aperture area.

Further details of the two RF coupling element track sections 368b, 468b are then shown by virtue of the reference numerals employed in the FIG. 11B representation of the differential transmitter RF coupling element transition arrangement 380.

As shown in FIG. 11B, the first RF coupling element track section 368b functionally comprises a first portion 368c and a second portion 368d. The first portion 368c continues in the same direction as the track section 368a that it is an extension of, so as to extend across the transmitter port waveguide opening 45 to a point approximately half way across the transmitter port waveguide opening 45, thereby to a first degree of approximation functionally merely extending the transmission line behaviour of the track section 368a, since any coupling to the waveguide is relatively weak. The second portion 368d extends from the first portion 368c, however the second portion 368d extends in an angular direction to the direction that the track section 368a and first portion 368c extend along. This second portion 368d will thereby perform the majority of the coupling from the track section 368a to the waveguide.

As also shown in FIG. 11B, the second RF coupling element track section 468b functionally comprises a first portion 468c and a second portion 468d. The first portion 468c continues in the same direction as the track section 468a that it is an extension of, so as to extend across the transmitter port waveguide opening 45 to a point approximately half way across the transmitter port waveguide opening 45, thereby to a first degree of approximation functionally merely extending the transmission line behaviour of the track section 468a, since any coupling to the waveguide is relatively weak. The second portion 468d extends from the first portion 468c, however the second portion 468d extends in a different angular direction to the direction that the track section 468a and first portion 468c extend along. This second portion 468d will thereby perform the majority of the coupling from the track section 468a to the waveguide.

The angular direction of the second portion 468d of the second RF coupling element track section 468b is opposed to the angular direction of the second portion 368d of the first RF coupling element track section 368b, i.e. in the case of the first RF coupling element track section 368b, the second portion 368d extends onward from the first portion section 368c away from the first side 445 of the transmitter port waveguide opening 45, whereas in the case of the second RF coupling element track section 468b, the second portion 468d "turns back" toward the first side 445 of the transmitter port waveguide opening 45.

For comparison, it may be noted that if the second portions 368d and 468d are omitted, the remaining first portions 368c and 468c would generate a higher order mode within the waveguide that would prove a less efficient coupling. This may be employed in alternative embodiments.

However, in this embodiment, the inclusion also of the respective second portions 368d and 468d with opposed angular directions in the respective RF coupling element track section 368b and 468b provides an improved coupling efficiency into the waveguide.

Moreover, this is particularly the case in the above embodiments in which the second portions 368d and 468d are provided in a buried layer which is an asymmetric buried layer. (Referring to FIG. 5, it is noted that the buried layer is an asymmetric layer in the sense that due to the constructional arrangement of the RF board 32, in particular the inclusion of the bond ply layer 63, the distance between the buried copper layer of the RF coupling element track sections 368b and 468b and the copper layer at the outer surface of the upper double-sided pcb 62 is different to the distance between the buried copper layers of the RF coupling element track sections 368b and 468b and the copper layer at the outer surface of the lower double-sided pcb 64.) The asymmetrical arrangement of the RF coupling element track sections 368b and 468b and associated ground planes (in copper layer 68) is taken into account during the design of the track sections in order to provide the required transmission line impedances.

In the differential transmission transition arrangement described with reference to FIGS. 11A and 11B, the second portions 368d and 468d follow a straight direction, with a discrete angular interface (shape-wise) with respect to the first portions 368c and 468c. However, this need not be the case, and in other embodiments other shapes may be used for the second portions 368d and 468d, for example curved, with a gradual curved angular displacement from the respective first portions 368c and 468c.

In the differential transmission transition arrangement described with reference to FIGS. 11A and 11B, the second portions 368d and 468d are substantially parallel with each other, i.e. their respective angles with the first portions 368c and 468c are complementary to each other. However, this need not be the case, and in other embodiments they may be other than substantially parallel with each other.

The angular directions the second portions 368d and 468d make to the first portions 368c and 468c may be any angle, although angles of 30° to 60° or 120° to 150° are preferred, and angles substantially equal to 45° and 125° are yet more preferred, as giving stronger effect (compared to a conventional balanced transmission line arrangement), whereas angles that are close to 90° result in only a small level of effect (compared to a conventional balanced transmission line arrangement).

The copper track arrangements described above with reference to FIGS. 7, 10 and 11 may conveniently be termed transition line interfaces (in the case of FIG. 11, more particularly a differential transition line interface). Moreover, since they are provided in an inner layer of a multilayer RF board 32, they may more particularly be termed buried transition line interfaces, and in the case of FIG. 11 a buried differential transition line interface.

Figure 12:
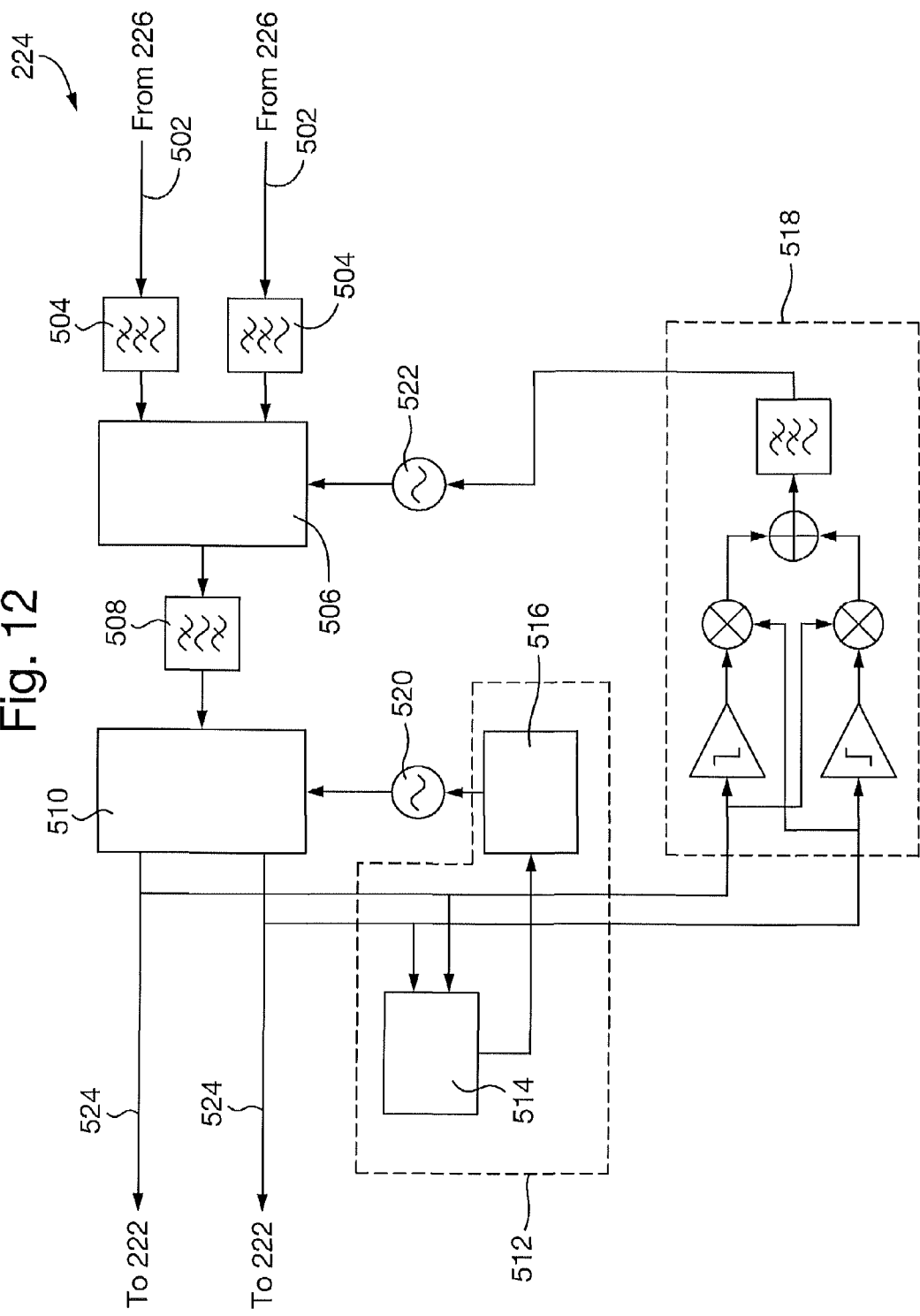
FIG. 12 is a circuit diagram showing certain elements of a receive modem analogue circuit of the camera communication unit of FIG. 2.

FIG. 12 is a circuit diagram showing certain elements of the receive modem analogue circuit 224 of this embodiment.

The receive modem analogue circuit 224 comprises inputs 502 arranged to receive baseband RF inputs from the receiver circuit 226. The receive modem analogue circuit 224 further comprises low-pass filters 504, an IQ modulator (i.e. up-converter) 506, a band-pass filter 508, an IQ demodulator (i.e. down-converter) 510, a discriminator and control function module 512 (the discriminator and control function module 512 comprising a discriminator module 514 and a control function module 516), a Costas loop sub-module 518, a down converter voltage controlled oscillator (VCO) 520, an up-converter VCO 522, and outputs 524 arranged to output processed baseband outputs to the receive modem digital circuit 222.

The low-pass filters 504 are coupled to the baseband inputs 502 and the IQ modulator 506. In operation the low-pass filters 504 receive the baseband RF inputs from the receiver circuit 226, perform low-pass filtering on them, and forward the low-pass filtered signals to the IQ modulator 506.

The IQ modulator 506 is further coupled to the up-converter VCO 522 and the band-pass filter 508. In operation the IQ modulator 506 performs up-conversion on the signals making use of a frequency source provided by the up-converter VCO 522, and forwards the up-converted signals to the band-pass filter 508.

The band-pass filter 508 is further coupled to the IQ demodulator 510. In operation the band-pass filter 508 band-pass filters the signals and forwards them to the IQ demodulator 510.

The IQ demodulator 510 is further coupled to the down-converter VCO 520, the discriminator module 514, the Costas loop sub-module 518, and the baseband outputs 524. In operation, the IQ demodulator 510 performs down-conversion on the signals making use of a frequency source provided by the down-converter VCO 520, and forwards the down-converted signals to the discriminator module 514, the Costas loop sub-module 518, and the baseband outputs 524.

The discriminator module 514 is further coupled to the control function module 516. In operation the discriminator module performs discrimination on the signals and forwards a resulting output to the control function module 516.

The control function module is further coupled to the down-converter VCO 520. In operation, the control function module 516 performs a control function based on the output received from the discriminator module 514 and forwards a resulting control output to the down-converter VCO 520.

The Costas loop sub-module 518 is further coupled to the up-converter VCO 522. In operation, the Costas sloop sub-module 518 performs part of the role of a conventional Costas loop, and forwards a resulting control output to the up-converter VCO 522.

Making use of the control output received from the Costas loop sub-module 518, the up-converter VCO 522 determines the frequency value to be employed as it acts, as mentioned above, as the frequency source for the IQ modulator 506.

Making use of the control output received from the control function module 516, the down-converter VCO 520 determines the frequency value to be employed as it acts, as mentioned above, as the frequency source for the IQ demodulator 510.

The baseband outputs 524 forward the down-converted signals received from the IQ demodulator 510 to the receive modem digital circuit 222.

In this embodiment, quadrature phase shift keying (QPSK) modulation is employed, but other types of modulation may be employed instead, for example quadrature amplitude modulation (QAM), minimum shift keying (MSK) and so on.

In overview, the receive modem analogue circuit 224 operates to remove phase and frequency offsets that occur as part of the transmission/modulation process. The resulting output is then a "stationary" constellation that can be readily decoded and further processed. That is, the modulation scheme (in this embodiment QPSK) applies rotation to the signals so that symbols of an incoming signal have in effect "unknown phase" and, due to the offset frequency between the two ends of the communications link not being known, also have a "spinning constellation". The symbols are in effect "rotated" by the receive modem analogue circuit 224 so that the modulation scheme (here QPSK) constellation points are in effect "lined up" appropriately. That is the baseband signals output from the receive modem analogue circuit 224 to the receive modem digital circuit 222 have had their frequency and phase offsets removed (or at least reduced). This may generally be considered as a carrier recovery process. The extent of rotation is determined by the Costas loop sub-module 518. That is, the Costas loop sub-module 518 comprises those elements of a conventional Costas loop that function to analyse the output being output by the receive modem analogue circuit 224, determine how much rotation there is, and generate the required signal for indicating what frequency is required for balancing that rotation.

The extent of the rotation is then in effect controlled by the receive modem analogue circuit 224 in a feedback manner by controlling the frequency difference between the two VCOs 520, 522.

Further details of the above described operation of the receive modem analogue circuit 224 are as follows.

The baseband inputs 502 from the receiver circuit 226 are converted to an intermediate frequency (IF) using the IQ modulator 506. The up-converter VCO 522 that provides the frequency source for this conversion is itself controlled by a loop that extracts the carrier phase from the symbol stream. This loop is based on a (conventional) Costas loop method. The IF is then filtered by the band-pass filter 508 to remove any spurious signals and down-converted in the IQ demodulator 510 using a second VCO, namely the down-converter VCO 520, as the frequency source. When the carrier recovery loop is locked, the output of the IQ demodulator 510 is rotated such that the receiver modulation constellation is at the correct phase. These baseband signals can then be output to the receive modem digital circuit 222 for further processing. The carrier recovery loop recognises errors in the output constellation rotation and applies the appropriate corrections to the up-converter VCO 522.

The other VCO, i.e. the down-converter VCO 520, is controlled so that the nominal frequency of the two VCOs 520, 522 tracks long-term. The discriminator and control functions implemented by the discriminator module 514 and control function module 516 respectively are responsible for achieving this tracking. This 'long-term' tracking of the two VCOs 520, 522 means that the carrier recovery loop does not need to accommodate large frequency offsets which would otherwise lead to difficulty in acquiring and maintaining carrier lock. This tends to gives rise to a straightforward, low power, low cost VCO design that does not require onerous stability.

In the above operation, in effect the IQ modulator 506 converts the incoming low-pass filtered baseband input signals to an intermediate frequency (IF).

Thus it will be appreciated by the skilled person that, in the receive modem analogue circuit 224 as a whole, a portion of a conventional Costas loop circuit has been used in combination with a different approach to up and down conversion than would normally be used in or even considered for a conventional Costas loop. In other words, a conventional Costas loop would require a received signal being input to the Costas loop to be in intermediate frequency form, having been pre-processed in conventional form into that intermediate frequency form. Therefore, if a skilled person desired to process an incoming baseband signal using a conventional Costas loop, the obvious approach would be to perform baseband to intermediate conversion (up-conversion) before inputting the resulting intermediate frequency signal into a conventional Costas loop arrangement. This is not the same as the approach used by the provision of the receive modem analogue circuit 224, which in contrast uses up-conversion as a fundamental element playing a feedback role within a new form of implementing a Costas loop type approach.

In other simpler embodiments, the discriminator and control function module 512 may be omitted. However, in this embodiment, additional advantages are provided by the discriminator and control function module 512 as follows.

In Costas loop type operation, the VCO can be difficult to implement because the Costas loop requires the offset being removed to be within a certain size, i.e. not too great. For example, if frequency differences are too high at start-up, or phase rotation is too fast in the incoming signal, there can be a failure to lock. This aspect is particularly relevant in the receive modem analogue circuit 224 as this has two VCOs operating, and their relative differences of frequency play a significant role. The discriminator module 514 monitors the residual frequency difference at the output from the IQ demodulator 510 and uses that measured residual frequency difference to control or specify the frequency for the down-converter VCO 520, hence controlling or specifying the relative frequency alignment between the two VCOs 520, 522 at first lock-in attempts or at recalibration stages i.e. in effect each time the Costas loop is being started up.

Note, in this embodiment the discriminator and control function module 512 controls the relative frequency alignment between the two VCOs 520, 522 by controlling (only) the down-converter VCO 520. However, this need not be the case, and in other embodiments the discriminator and control function module 512 may control the relative frequency alignment between the two VCOs 520, 522 by controlling only the up-converter VCO 522 or even by controlling both the VCOs 520, 522.

The discriminator module 514 and control function module 516 may be implemented in any suitable manner to carry out the operations described above. Further details of the discriminator module 514 and control function module 516 of this embodiment are as follows.

The discriminator module 514 operates on the baseband outputs 524 to determine the value of any frequency offset that is caused in these outputs by the frequency difference between the two VCOs 520, 522. Once this value is known, it can be used via the control function module 516 to adjust the down-converter VCO 520. In order to facilitate this, the baseband inputs to the receive modem analogue circuit 224 are held at fixed levels, representing a fixed symbol. This is implemented by disconnecting the baseband inputs 502 arriving from the transceiver 26 and replacing them with a fixed level. Given that the symbol is now unchanging, it is possible to implement the discriminator module simply; in this embodiment it comprises a complex baseband filter with a constant frequency-amplitude slope so that the frequency can be ascertained by comparing signal levels before and after the filter. This frequency is in effect passed to the control function module 516. This implementation of the discriminator module 514 is simple yet adequate since it is only intended to measure and correct the frequency terms with sufficient accuracy that the Costas loop functionality can acquire once the baseband inputs 502 arriving from the transceiver 26 are again applied to the receive modem analogue circuit 224. In this embodiment the Costas loop functionality can lock provided the residual frequency error is less than approximately 10 MHz.

Any appropriate Costas loop circuit may be used as the basis for the portion thereof employed in the Costas loop sub-module 518. For example, a Costas loop as described in "Synchronous data recovery in RF communication channels"; Song, B.-S.; IEEE Journal of Solid-State Circuits, Volume: 22, Issue: 6, Digital Object Identifier: 10.1109/

JSSC.1987.1052870, Publication Year: 1987, Page(s): 1169-1176, the contents of which are incorporated herein by reference.

Any conventional implementation of a receive modem digital circuit may be used for implementation of the receive modem digital circuit 222. Furthermore, it will tend to be the case that these can be simplified compared to usual implementations due to the carrier recovery process and other processes already performed by the receive modem analogue circuit 224. Indeed, a further advantage of the receive modem analogue circuit 224 is that the carrier recovery process may be implemented more easily or more efficiently by the receive modem analogue circuit 224 than would be the case for the digital recovery that would otherwise need to be implemented in the receive modem digital circuit 222. In further detail, the receive modem digital circuit 222 of this embodiment is arranged to perform (amongst possibly other functions) the following: clock recovery (i.e. recover the symbol clock from the data stream); recovery of frame-timing (i.e. determine where data frames start); and channel coding (i.e. error correction).

For completeness, referring back to FIG. 2, it is noted that both the transmit modem analogue circuit 124 and the transmit modem digital circuit 122 may be implemented in any conventional fashion.

Apparatus for implementing the above described circuits, including the receive modem analogue circuit 224, may be provided by configuring or adapting any suitable electronic components or other apparatus, for example one or more processors.

A relatively large number of communication units 6 may be provided, to give a corresponding number of bidirectional links with the production communication unit 8, with these links operating simultaneously or in other overlapping temporal sense, whilst nevertheless using the same pair of transmit and receive frequencies, by providing a relatively narrow antenna beam angle for the antennas 12, and positioning the respective communication units 6 so that their beams do not overlap when they are communicating with the production communication unit 8. Preferably the communication units 6 each have an antenna beam angle of less than or equal to 2°. For example, in one embodiment, sixteen bidirectional links are provided by sixteen communication units whose antennas each have a beam angle of approximately 1.2°, and the units are positioned so that there is at least a 3° separation between each bidirectional link's line of sight.

In any of the above embodiments, the transmission and reception RF frequencies are preferably greater than or equal to 50 GHz, and yet more preferable greater than or equal to 55 GHz.

In any of the above embodiments, a preferable frequency separation between receiving and transmitting on the bidirectional links is in the range of 4 GHz to 5 GHz. For example, in any of the above embodiments a suitable frequency pair may be one in which transmission by one or more of the communication units 6 is performed at approximately 58 GHz and reception (by the same one or more communication units 6) at approximately 62.5 GHz, or vice-versa (i.e. a frequency separation between transmit and receive of approximately 4.5 GHz).

In further embodiments, the communication units 6 are adapted to be used in a reconfigurable sense, i.e. for use at other frequencies within a given frequency band, for example at other frequencies within a frequency band of 56.5 GHz to 64 GHz (with change of diplexer frequencies).

In the above embodiments, the communication system is used to provide wireless links, e.g. fixed wireless links, as part of a television outside broadcast arrangement. However, this need not be the case, and the communication system or one or more of its elements may be used for other point-to-point applications where video data is to be communicated, for example uncompressed high resolution video. Also, the video data formats and/or rates described in the above embodiments are not essential, and other formats and/or rates may be communicated. Such data may be compressed or uncompressed as required. In yet further embodiments, data other than video data may be communicated, in particular when the data flow rates are comparable to video data flow rate requirements.

In the above embodiments, the communication system is bidirectional. However, this need not be the case, and in other embodiments the communication system is unidirectional.

In the above embodiments the various components of the communication unit are physically mounted in an enclosure, and the antenna is physically mounted on the enclosure. However, these details need not be the case. For example, in other embodiments the various components may be mounted or otherwise contained in more than one enclosure, or may be mounted or otherwise arranged in an exposed manner not involving an enclosure as such. Also, the antenna may be located in a manner other than fixed on any enclosure, for example in the enclosure, or free standing separate from the enclosure.

In the above embodiments, at least the majority of the circuitry for the transmit and receive digital modem functions is provided on a respective given single board, and at least a majority of the circuitry for the transmit and receive analogue modem functions is provided on a further given board. However, this need not be the case, and in other embodiments these respective circuits may be provided on plural boards, and some or all the digital modem circuitry may be provided on a same board or boards as some or all of the analogue modem circuitry.

In the above embodiments, the diplexer 34 is formed from, and has the outer dimensions of, a rectangular shaped solid block or slab. In other embodiments, the shape may be other than rectangular. Also, the block need not be formed from only a single block as such, for example two sub-parts could be adhered together. In the above embodiments the diplexer is made of aluminium finished with an Iridite (trademark) surface finish. However, these details are not essential, for example a different surface treatment, or no surface treatment, may be applied. Also, materials other than aluminium may be used for the diplexer, for example brass or copper with silver plating to reduce millimeter wave losses. In the above embodiments the laminated structure is provided by the RF board 32 being bonded to a surface of the diplexer 34, however in other embodiments other fixing arrangements may be employed. In the above embodiments the communication unit further comprises a separate power supply board. However, this need not be the case, and in other embodiments power supply components may be provided in-situ on the other boards, or otherwise provided.

The relative arrangement, and stacking approach, in the above embodiments of the power supply board/digital modem (board)/analogue modem (board)/transceiver is not essential, and these (or other elements in other embodiments) may be physically arranged/stacked in other ways in other embodiments. The size of the enclosure described earlier above and indicated in FIG. 3 is merely exemplary.

Regarding the mounting arrangement of the transmit and receive ICs 50 and 52, and other components, on the RF board 32, described above with reference to FIG. 4, the details thereof need not be as described in the above embodiments. For example, in other embodiments, other ways of mounting and connecting the transmitter IC 50 and the receiver IC 52 may be employed. Also, the transmitter IC 50 and the receiver IC 52 need not be positioned at positions that are approximately aligned with the positions of the diplexer transmitter port waveguide opening 45 and the receiver port waveguide opening 47 respectively, however this will increase track lengths between the IC and the port coupling arrangement.

In other embodiments, different transmitter and receiver ICs to those used in the above embodiments may be employed instead.

The various details relating to the RF board, as described with reference to FIG. 5, are not essential, and in other embodiments other forms and detail of RF board may be used instead.

Various details of the diplexer 34 waveguide structure and waveguide openings, as described for example with reference to FIGS. 6A and 6B, are not essential, and in other embodiments other forms and detail of waveguide structure and waveguide openings may be used instead.

In the above embodiments the waveguide structure is formed in the solid block of the diplexer by machining the solid block to hollow out the waveguide structure. The machining is controlled, or further machining is performed, to provide the filters. The waveguide filters provide low insertion loss and high Q factor so that the transmit and receive frequencies can be placed closer together for a particular isolation. However, in other embodiments, other techniques may be used instead. For example, in other embodiments, a microstrip filter may be implemented on the outer surface of the upper double-sided pcb 62. This would however have higher insertion loss and lower Q factor.

Certain advantages that tend to be provided are as follows.

The above described use of a solid block diplexer with an RF board bonded thereto provides a compact arrangement with advantageous balance between transmission and reception separation compared to dilution of power. This approach also advantageously allows the same polarisation to be used for both transmission and reception (although this is not essential), which is particularly advantageous for outside broadcast applications as this can accommodate to an extent the nature of the attenuation that is caused by rain, where vertical polarised signals suffer lower rain attenuation compared to horizontally polarised signals.

The RF board 32 is relatively thin and requires mechanical support and a heat sink. Advantageously, the diplexer 34 can perform these functions in addition to its fundamental diplexing role, thereby tending to provide a compact and lightweight overall apparatus structure by avoiding or reducing the need for separate physical support and heat sink for the RF board.

A range of greater than 1 km based on use of QPSK modulation and forward error correction may be provided, despite operation being at a frequency band located around 60 GHz.

A physically compact apparatus may be provided, despite operation being at a frequency band located around 60 GHz.

Bi-directional duplex link operation using frequency division multiplexing may be provided, despite operation being at a frequency band located around 60 GHz.

The above potential advantages are particularly advantageous for use in outside broadcast applications and the like.

In the above description, the various embodiments of analogue modem circuits, and the various embodiments of carrier recovery methods performed by analogue modem circuits, have been described in relation to, and are particularly advantageous in the context of, the above described particular examples of wireless communication systems, wireless communication units, for example, ones including one or more of: a block diplexer, bidirectional communication, differential transmission, single RF boards, single antenna, outside broadcast, point-to-point communication, bidirectional links, operation at frequencies greater than 50 GHz, and so on. However, it will be appreciated that the described embodiments of analogue modem circuits, and the described embodiments of carrier recovery methods performed by analogue modem circuits, represent embodiments of the present invention in themselves and may be used in a large number of contexts and arrangements other than the ones described above.

The invention claimed is:

1. An analogue modem circuit for use between a radio frequency receiver and a digital modem circuit, the analogue modem circuit comprising:
   inputs for receiving a baseband RF input signal from the RF receiver;
   an up-converter with frequency supplied by an up-converter voltage controlled oscillator (VCO);
   a down-converter with frequency supplied by a down-converter VCO;
   a Costas loop sub-module; and
   outputs for outputting baseband outputs from the down-converter to the digital modem circuit; wherein:
   the up-converter is arranged to feed the down-converter, and the Costas loop module is configured to perform Costas loop functionality on the output of the down-converter to control the up-converter VCO frequency output to thereby control modification of rotation of symbols of the baseband RF input signal as it is up-converted and then down-converted to provide the baseband outputs.

2. An analogue modem circuit according to claim 1, wherein at least one of the VCOs is configured to be controlled dependent upon a residual frequency difference between the two VCOs at the output from the down-converter, at a time when the Costas loop functionality is being started.

3. An analogue modem circuit according to claim 2, configured so that the controlling will be performed at a first lock-in attempt of the Costas loop functionality.

4. An analogue modem circuit according to claim 2, configured so that the controlling will be performed at a recalibration stage of the Costas loop functionality.

5. An analogue modem circuit according to claim 2, configured so that the residual frequency difference will be determined when holding the baseband inputs at fixed levels, representing a fixed symbol.

6. An analogue modem circuit according to claim 5, further comprising:
   a complex baseband filter with a constant frequency-amplitude slope, wherein the residual frequency is to be determined by comparing signal levels before and after the filter.

7. A carrier recovery method performed by an analogue modem circuit for use between a radio frequency (RF) receiver and a digital modem circuit, the method comprising:
   receiving a baseband RF input signal from the RF receiver at inputs of the analogue modem circuit;
   supplying, via an up-converter voltage controlled oscillator (VCO), frequency to an up-converter;
   supplying, via a down-converter VCO, a frequency to a down-converter;
   feeding the down-converter from the up-converter;
   performing, via a Costas loop module, Costas loop functionality on an output of the down-converter to control the up-converter VCO frequency output to thereby control modification of rotation of symbols of the baseband RF input signal as it is up-converted and then down-converted to provide baseband outputs; and outputting, from the analogue modem circuit, the baseband outputs.

8. A method according to claim 7, comprising:

controlling at least one of the VCOs dependent upon a residual frequency difference between the two VCOs at the output from the down-converter, at a time when the Costas loop functionality is being started.

9. A method according to claim 8, comprising:

performing the controlling at a first lock-in attempt of the Costas loop functionality.

10. A method according to claim 8, comprising:

performing the controlling at a recalibration stage of the Costas loop functionality.

11. A method according to claim 8, comprising:

determining the residual frequency difference when holding the baseband inputs at fixed levels, representing a fixed symbol.

12. A method according to claim 11, comprising:

determining the residual frequency difference by comparing signal levels before and after a complex baseband filter.

13. One or more processors arranged to operate in accordance with a carrier recovery method performed by an analogue modem circuit for use between a radio frequency (RF) receiver and a digital modem circuit, the method comprising:

receiving a baseband RF input signal from the RF receiver at inputs of the analogue modem circuit;

supplying, via an up-converter voltage controlled oscillator (VCO), a frequency to an up-converter;

supplying, via a down-converter VCO, a frequency to a down-converter;

feeding the down-converter from the up-converter;

performing, via a Costas loop module, Costas loop functionality on an output of the down-converter to control the up-converter VCO frequency output to thereby control modification of rotation of symbols of the baseband RF input signal as it is up-converted and then down-converted to provide baseband outputs; and outputting, from the analogue modem circuit, the baseband outputs.

* * * * *